(12) United States Patent
Riestenpatt et al.

(10) Patent No.: US 6,624,229 B1
(45) Date of Patent: Sep. 23, 2003

(54) POWDER PAINTS AND THE USE THEREOF FOR PRODUCING LOW-NOISE POWDER PAINT COATINGS

(75) Inventors: Helmut Riestenpatt, Münster (DE); Rolf Boysen, Münster (DE); Birgit Perdun, Ascheberg (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/830,655

(22) PCT Filed: Oct. 28, 1999

(86) PCT No.: PCT/EP99/08183

§ 371 (c)(1),
(2), (4) Date: Apr. 26, 2001

(87) PCT Pub. No.: WO00/26307

PCT Pub. Date: May 11, 2000

(30) Foreign Application Priority Data

Oct. 31, 1998 (DE) .......................................... 198 50 211

(51) Int. Cl.⁷ ..................... C08L 91/06; C09D 191/06
(52) U.S. Cl. .................... 524/489; 524/487; 524/490; 524/904; 525/934; 106/270; 428/484
(58) Field of Search ................... 524/489, 490, 524/904; 525/934; 106/270; 428/484, 500

(56) References Cited

U.S. PATENT DOCUMENTS

| | | | |
|---|---|---|---|
| 3,341,580 A | 9/1967 | Hechenbleiker | 260/541 |
| 3,477,990 A | 11/1969 | Dante | 260/47 |
| 3,781,379 A | 12/1973 | Theodore et al. | 260/836 |
| 3,857,720 A * | 12/1974 | Fellows | |
| 3,872,040 A | 3/1975 | Mollohan et al. | 260/21 |
| 3,882,064 A * | 5/1975 | Pregmon | |
| 4,091,048 A | 5/1978 | Labana et al. | 260/836 |
| 4,217,426 A * | 8/1980 | McConnell et al. | |
| 4,237,037 A * | 12/1980 | Takahashi | |
| 4,304,698 A * | 12/1981 | Tachi et al. | |
| 4,340,698 A | 7/1982 | DeJongh et al. | 525/438 |
| 4,534,799 A * | 8/1985 | Aguirre | |
| 4,849,283 A | 7/1989 | Poeter, Jr. et al. | 428/323 |
| 5,055,524 A | 10/1991 | Pettit et al. | 525/172 |
| 5,635,548 A * | 6/1997 | Kittle et al. | |
| 6,184,311 B1 * | 2/2001 | O'Keeffe et al. | |

FOREIGN PATENT DOCUMENTS

| | | |
|---|---|---|
| DE | 22 14 650 B2 | 3/1972 |
| DE | 27 49 576 B2 | 11/1977 |
| DE | 195 22 475 C1 | 9/1996 |
| EP | 0 010 805 B1 | 10/1979 |
| EP | 0 107 888 B1 | 10/1983 |
| EP | 0 110 450 B1 | 10/1983 |
| EP | 0 110 451 A1 | 10/1983 |
| EP | 0 119 164 B1 | 3/1984 |
| EP | WO 8702043 | 4/1987 |
| EP | 0 299 420 A2 | 7/1988 |
| EP | 0 322 827 B1 | 12/1988 |
| EP | 0 326 230 A2 | 1/1989 |
| EP | 0 371 522 A1 | 10/1989 |
| EP | 0 389 926 A2 | 3/1990 |
| EP | 0 509 392 A1 | 4/1992 |
| EP | 0 509 393 A1 | 4/1992 |
| EP | 0 517 536 A2 | 6/1992 |
| EP | WO94/11446 A | 5/1994 |
| EP | 0 750 024 A2 | 12/1996 |
| FR | 2 235 988 A | 1/1975 |

OTHER PUBLICATIONS

English Abstract for FR2235988 3/75.
Product Data Sheet, A–C® Polyethylene, Current Issue Date 6/00, p. 1 of 1.

* cited by examiner

*Primary Examiner*—Tae H. Yoon

(57) ABSTRACT

The present invention relates to a powder coating material which contains preferably from 0.05 to 5% by weight, preferably from 0.5 to 2% by weight, of at least one polyethylene wax distributed homogeneously within the powder coating material.

8 Claims, No Drawings

POWDER PAINTS AND THE USE THEREOF FOR PRODUCING LOW-NOISE POWDER PAINT COATINGS

The invention relates to a novel powder coating material which delivers low-noise powder coatings. The present invention further relates to the use of pulverulent, preferably hard linear polyethylene waxes to suppress noises associated with the sliding stressing of powder coatings.

For a number of years, coating materials known as powder coatings have been continually increasing their field of use. Powder coating materials are in the form of a dry powder which is applied in finely divided form to the surface of the article that is to be coated, generally with the aid of electrostatic charging, and is then "dried", i.e., baked. During baking, which customarily takes place at temperatures between 130 and 220° C., crosslinking reactions and film forming result in the solid coat of paint, or the powder coatings, on the workpiece. Powder coating materials of this kind offer a range of advantages. For instance, owing to the pulverulent consistency of the coating material, there is no need to work with solvents. With powder coating materials, accordingly, all of the environmental problems normally associated with the evaporation of the solvents disappear.

Moreover, the heating energy otherwise needed to evaporate the solvents is spared. A further advantage of powder coating materials is that material which has not remained adhering to the workpiece can be collected from the floor of the powder booth and used again without difficulty. In this way it is possible to achieve a degree of powder utilization of up to 98%. Besides cost advantages, this increased degree of utilization is accompanied by a far lesser environmental burden than in the case of customary coating materials.

Powder coating materials are prepared from binders, curing agents, fillers, pigments, and additives. With regard to the binders and curing agents used, modern-day powder coating materials are based in general on one of the following polymer classes: epoxides; polyesters; polyester/isocyanates (poly-urethanes); or acrylates.

A problem associated with the use of powder coating materials, however, is to obtain a surface having sufficiently good properties. Commonly, there are considerable defects in the baked powder coating film, which reduce the surface smoothness. These surface defects result in part from the fact that the powder of the coating material, applied irregularly with its own structure, does not have sufficient time during baking to flow out during its liquid phase (with a minimum viscosity value) and, in so doing, to provide uniform coverage of the surface of the workpiece. The reason for this is that the process of melting and the achievement of the minimum viscosity is accompanied by the beginning of crosslinking of the binders and hence of polymerization of the coating material. A further important cause of irregular film surfaces is the phenomenon known as cratering. In general, it is impurities in the powder coating material that cause such defects.

In order to improve the surface smoothness of powder coatings, leveling additives have been used for a fairly long time. These additives are intended at the same time to suppress craters. For these purposes it is preferred to use acrylate heteropolymers and homopolymers in the molecular weight range of Mw=5 000 to 200 000. Typical examples thereof are Acronal 4 F® and Byk-360 P® (Acronal 4 F® is a brand of BASF AG; Byk-360 P® is a brand of Byk-Mallinckrodt).

Acronal 4 F® is a poly(n-butyl acrylate). According to its specification, this additive is solvent-free and has nonvolatile fractions of less than 1.5% on 30 min at 140° C. As a resin, it is soft, tough, and tacky, difficult to saponify, and has excellent light stability and aging stability. Used alone, Acronal 4 F® results in a tacky film of low strength. Byk-360 P® is an acrylate polymer which has been applied to a specific silica. The active substance is compounded at 60% to form a white, free-flowing powder. This leveling additive is equally effective in powder coating materials based on epoxy, acrylate, polyester, and polyurethane. It is mixed with resin, curing agent, and pigments and then extruded with all of the components.

Occasionally, low molecular mass polyesters are used as well.

The results obtained do not, however, meet the requirements imposed on the surface.

It is true that a considerable advance has been provided here by polyvinyl ethers, especially polyvinyl ethyl ethers having a number-average molecular weight Mn of from 1000 to 2000 and a mass-average molecular weight Mw of from 3000 to 4000.

However, these additives are likewise unable to suppress or prevent completely the noises, especially the squeaking and scratching noises, which are manifested, in many cases unpleasantly, during the sliding stressing of powder coatings. These noises occur, for example, with slide rails that are coated with powder coating materials when slide carriages are moved in them. Slide rails of this kind are used, for example, in the case of automobile bodies in order to mount and guide the slide carriages of the windows and of the seats.

EP 0 750 024 discloses, for example, additive formulations which are incorporated into waxes. However, it does not describe the production of low-squeak powder coatings. The prior art also discloses the use of wax as a grinding aid. The wax here is added only following extrusion. In other words, the wax is used at temperatures which lie below the extrusion temperature of the powder coating material. As a result, however, the wax is not incorporated homogeneously, i.e., is not an integral component of the powder coating material. The present invention set itself the object of providing powder coating materials and powder coatings which, with a view to the abovementioned low-noise requirements are improved in relation to the prior art.

This object is achieved in accordance with the invention by the powder coating material which comprises homogeneously distributed therein at least one pulverulent polyethylene wax. It is preferable in this case for the powder coating material to be preparable by adding the polyethylene wax to the powder coating mixture, prior to or during the extrusion of the powder coating material, in such a way that it is homogeneously incorporated. With preference, the powder coating material contains from 0.05 to 5% by weight, preferably from 0.5 to 2% by weight, of a polyethylene.

In accordance with the invention, the wax is not used as a grinding aid following extrusion but instead is incorporated in such a way that it becomes an integral part of the powder coating formulation. Accordingly, incorporation takes place preferably by addition of the wax prior to or during extrusion of the powder coating material, i.e., conjoint extrusion of the wax and of the powder coating material. The extrusion per se may be carried out in accordance with the commonly known methods.

The wax in the resulting powder coating brings about a degree of gloss of the resulting—i.e., cured —powder coating that corresponds to a slight flatting effect. This flatting corresponds advantageously to a degree of gloss of from 30 to 70%, in particular from 40 to 60%, measured at an angle of 60°.

The present invention further provides a process for preparing a powder coating material, in which at least one polyethylene wax is homogeneously distributed in the powder coating material. It is preferred to incorporate from 0.05 to 5% by weight, preferably from 0.5 to 2% by weight, into the powder coating material. The polyethylene wax is preferably incorporated at temperatures which correspond approximately to the extruder temperature during the preparation of the powder coating materials. It is preferred, accordingly, to incorporate the wax during the extrusion of the powder coating material. Nevertheless, it is possible in accordance with the invention to use all methods which ensure homogeneous distribution.

It is preferable for the dropping point of the waxes used to lie within the range of the extruder temperature during the preparation of the powder coating material. In other words, the dropping point corresponds approximately to the processing temperature of the powder coating mixture in the extruder. This temperature is preferably between 100 and 150° C., with particular preference between 120 and 130° C. The wax, accordingly, has a dropping point which lies approximately within the range which is obtained during the extrusion of the powder coating material. Alternatively, the dropping point may be situated above or below the stated ranges. Particular preference is given to a dropping point which lies less than 10° C. below and not more than 25° C. above the extruder temperature. Very particular preference is given to less than 5° C. below and not more than 10° C. above the extruder temperature. The upper particle size limit of the wax is preferably from 1 to 50, more preferably from 20 to 30 $\mu$m. Advantageously, the average particle size (50% value) is from 6 to 8 $\mu$m.

This ensures especially that the wax is incorporated homogeneously into the powder coating material (homogeneous distribution of the binder). Nevertheless, the anti-squeak effect is based not only on a surface effect; this also ensures that the wax remains homogeneously distributed in the baked powder coatings. As a result, the anti-squeak effect is lasting, even after a number of years.

The preferred waxes include hard and linear polyethylene waxes. A particular reason for preferring these waxes is that their use in combination with customary and known powder coating materials based on carboxyl-containing polyesters and low molecular mass epoxides makes it possible in general to dispense with the toxicologically unacceptable triglycidyl isocyanurate (TGIC) as a low molecular mass epoxide without this being at the expense of disadvantages.

Suitable powder coatings include all known coating formulations, examples being those described in EP-509 392, EP-509 393, EP-322 827, EP-517 536, US 5,055,524 and US-4,849,283.

The powder coating material may in particular comprise epoxy resins, including epoxidized novolaks, crosslinking agents, preferably phenolic or aminic curing agents or bicyclic guanidines, catalysts, fillers, and, if desired, auxiliaries and additives.

The powder coating materials used in accordance with the invention preferably comprise epoxy resins, phenolic crosslinking agents, catalysts, assistants, and also, if desired, auxiliaries and powder-typical additives and flow aids.

Suitable epoxy resins are all solid epoxy resins having an epoxide equivalent weight of between 400 and 3,000, preferably from 600 to 2,000. They comprise primarily epoxy resins based on bisphenol A and bisphenol F. Epoxidized novolak resins are preferred. These preferably have an epoxide equivalent weight of from 500 to 1,000.

The epoxy resins based on bisphenol A and bisphenol F generally have a functionality of less than 2, the epoxidized novolak resins a functionality of more than 2. In the powder coating materials of the invention, particular preference is given to epoxidized novolak resins having an average functionality in the range from 2.4 to 2.8 and having an epoxide equivalent weight in the range from 600 to 850. In the case of the epoxidized novolak resins, the phenolic hydroxyl groups are etherified with alkyl groups, acrylic groups or similar groups. By reaction of the phenolic hydroxyl groups with epichlorohydrin, epoxide groups are incorporated into the molecule. This produces, starting from novolaks, the so-called epoxy novolak. The epoxidized novolaks are structural relations of bisphenol A resins. Epoxidized novolak resins may be prepared by epoxidizing novolaks consisting, for example, of 3 or 4 phenol nuclei linked to one another by way of methylene bridges. As novolak resins it is also possible to use alkyl-substituted phenols, which are reacted with formaldehyde.

Examples of suitable epoxy resins are the products available commercially under the following names: Epikote 1004, 1055, 3003, 3004, 2017 from Shell-Chemie, DER 640, 671, 662, 663U, 664, 667 from Dow, and Araldit GT 6063, 6064, 6084, 6097, 7004, 7220, 7225 from Ciba Geigy.

Examples of suitable epoxy-functional binders for the powder clearcoat materials are polyacrylate resins containing epoxide groups, which are preparable by copolymerizing at least one ethylenically unsaturated monomer containing at least one epoxide group in the molecule with at least one further ethylenically unsaturated monomer containing no epoxide group in the molecule, at least one of the monomers being an ester of acrylic acid or methacrylic acid.

Polyacrylate resins containing epoxide groups are known (cf., e.g., EP-A-299 420, DE-B-22 14 650, DEB-27 49 576, US-A-4,091,048 and US-A-3,781,379).

Examples of the ethylenically unsaturated monomers which contain at least one epoxide group in the molecule include glycidyl acrylate, glycidyl methacrylate, and allyl glycidyl ether.

Examples of ethylenically unsaturated monomers which contain no epoxide group in the molecule include alkyl esters of acrylic and methacrylic acid containing from 1 to 20 carbon atoms in the alkyl radical, especially methyl acrylate, methyl methacrylate, ethyl acrylate, ethyl methacrylate, butyl acrylate, butyl methylacrylate, 2-ethylhexyl acrylate and 2-ethylhexyl methacrylate. Further examples of ethylenically unsaturated monomers containing no epoxide groups in the molecule are acids, such as acrylic acid and methacrylic acid, acid amides, such as acrylamide and methacrylamide, vinylaromatic compounds, such as styrene, methylstyrene, and vinyltoluene, nitrites, such as acrylonitrile and methacrylonitrile, vinyl halides and vinylidene halides, such as vinyl chloride and vinylidene fluoride, vinyl esters, such as vinyl acetate, and hydroxyl-containing monomers, such as hydroxyethyl acrylate and hydroxyethyl methacrylate, for example.

The polyacrylate resin containing epoxide groups normally has an epoxide equivalent weight of from 400 to 2,500, preferably from 500 to 1,500, with particular preference from 600 to 1,200, a number-average molecular weight (determined by gel permeation chromatography using a polystyrene standard) of from 1,000 to 15,000, preferably from 1,200 to 7,000, with particular preference from 1,500 to 5,000, and a glass transition temperature (Tg) of from 30 to 80, preferably from 40 to 70, with particular preference from 50 to 70° C. (measured by means of differential scanning calorimetry (DSC)). The polyacrylate resin containing epoxide groups may be prepared in accordance with commonly known methods, by free-radical polymerization.

Examples of suitable curing agents for the polyacrylate resin containing epoxide groups are polyanhydrides of polycarboxylic acids or of mixtures of polycarboxylic acids, especially polyanhydrides of dicarboxylic acids or of mixtures of dicarboxylic acids.

Polyanhydrides of this kind are preparable by removing water from the polycarboxylic acid or mixture of polycarboxylic acids, in each case two carboxyl groups being reacted to form one anhydride group. Preparation processes of this kind are well known and therefore need no further explanation.

To cure the epoxy resins, the powder coating material of the invention may include phenolic or aminic curing agents. Bicyclic guanidines may also be employed.

In this context it is possible, for example, to use any desired phenolic resin provided it has the methylol functionality required for reactivity. Preferred phenolic resins are products of the reaction under alkaline conditions of phenol, substituted phenols and bisphenol A with formaldehyde. Under such conditions, the methylol group is linked to the aromatic ring in either the ortho or para position. In accordance with the present invention, particularly preferred phenolic crosslinking agents used include hydroxyl-containing bisphenol A resins or bisphenol F resins having a hydroxyl equivalent weight in the range from 180 to 600, with particular preference in the range from 180 to 300. Phenolic crosslinking agents of this kind are prepared by reacting bisphenol A or bisphenol F with glycidyl-containing components, such as the diglycidyl ether of bisphenol A, for example. Phenolic crosslinking agents of this kind are obtainable, for example, under the commercial designation DEH 81, DEH 82, and DEH 87 from Dow, DX 171 from Shell-Chemie, and XB 3082 from Ciba Geigy.

The epoxy resins and the phenolic crosslinking agents are used in a ratio such that the number of epoxide groups is approximately 1:1 to the number of phenolic OH groups.

The powder coating materials of the invention comprise one or more suitable catalysts for curing the epoxy resin. Suitable catalysts are phosphonium salts of organic or inorganic acids, imidazole and imidazole derivatives, quaternary ammonium compounds, and amines. The catalysts are generally used in fractions of from 0.001% by weight to about 10% by weight, based on the overall weight of the epoxy resin and of the phenolic crosslinking agent.

Examples of suitable phosphonium salt catalysts are ethyltriphenylphosphonium iodide, ethyltriphenylphosphonium chloride, ethyltriphenylphosphonium thio-cyanate, ethyltriphenylphosphonium acetateacetic acid complex, tetrabutylphosphonium iodide, tetrabutylphosphonium bromide, and tetrabutylphosphonium acetateacetic acid complex. These and further suitable phosphonium catalysts are described, for example, in U.S. Pat. No. 3,477,990 and U.S. Pat. No. 3,341,580.

Examples of suitable imidazole catalysts are 2-styrylimidazole, 1-benzyl-2-methylimidazole, 2-methylimidazole, and 2-butylimidazole. These and further imidazole catalysts are described, for example, in the Belgian patent No. 756,693.

In some cases, commercially customary phenolic crosslinking agents already include catalysts for crosslinking the epoxy resin.

Powder coatings based on carboxyl-containing polyesters and on low molecular mass crosslinking agents containing epoxide groups are known in large numbers and described, for example, in EP-A-389 926, EP-A-371 522, EP-A-326 230, EP-B-110 450, EP-A-110 451, EP-B-107 888, US 4,340,698, EP-B-119 164, WO 87/02043 and EP-B-10 805.

Particularly suitable powder coating materials are those whose film-forming material comprises carboxyl-containing polyesters having an acid number of 10–150 mg KOH/g and epoxy resins having an epoxide equivalent weight of 350–2 000.

The carboxyl-containing polyesters used have an acid number in the range of 10–150 mg KOH/g, preferably in the range of 30–100 mg KOH/g. The hydroxyl number of the polyester resins should be $\leq$30 mg KOH/g. It is preferred to use polyesters having a carboxyl functionality of $\geq$2. The polyesters are prepared in accordance with the customary methods (compare, for example, Houben Weyl, Methoden der Organischen Chemie, 4$^{th}$ edition, Volume 14/2, Georg Thieme Verlag, Stuttgart 1961).

Suitable carboxylic acid components for preparing the polyesters include aliphatic, cycloaliphatic, and aromatic dicarboxylic and poly-carboxylic acids, such as phthalic acid, terephthalic acid, isophthalic acid, trimellitic acid, pyromellitic acid, adipic acid, succinic acid, glutaric acid, pimelic acid, suberic acid, cyclohexanedicarboxylic acid, azelaic acid, sebacic acid, and the like. These acids may also be used in the form of their esterifiable derivatives (e.g., anhydrides) or their trans-esterifiable derivatives (e.g., dimethyl esters).

Suitable alcohol components for preparing the carboxyl-containing polyesters A) include the commonly used diols and/or polyols, examples being ethylene glycol, 1,2-propanediol and 1,3-propanediol, butanediols, diethylene glycol, triethylene glycol, tetraethylene glycol, 1,6-hexanediol, neopentyl glycol, 1,4-dimethylolcyclohexane, glycerol, trimethylolethane, trimethylolpropane, pentaerythritol, ditrimethylolpropane, dipentaerythritol, diglycerol, and the like. The polyesters thus obtained may be used individually or as a mixture of different polyesters. The polyesters suitable as component A) generally have a glass transition temperature of more than 30° C.

Examples of suitable commercial polyesters are the products obtainable commercially under the following brand names: Crylcoat 314, 340, 344, 2680, 316, 2625, 320, 342, and 2532 from UCB, Drogenbos, Belgium; Grilesta 7205, 7215, 72-06, 72-08, 72-13, 72-14, 73-72, 73-93, and 7401 from Ems-Chemie; Neocrest P670, P671, P672, P678, P662 from ICI; Rearfree 6600 from Resisa, Spain; and Uralac P2400, Uralac P3400 and Uralac P5000 from DSM.

As the acidic polyester component, unsaturated polyester resins containing carboxyl groups are also suitable. These are obtained by polycondensation, for example, of maleic acid, fumaric acid or other aliphatic or cycloaliphatic dicarboxylic acids with an ethylenically unsaturated double bond, together, if desired, with saturated polycarboxylic acids, as the polycarboxylic acid component. The unsaturated groups may also be introduced into the polyester by way of the alcohol component, e.g., by means of trimethylolpropane monoallyl ether.

The powder coating materials commonly contain from 50 to 90%, preferably from 60 to 80%, by weight of binder and from 10 to 45% by weight, preferably from 20 to 35% by weight, of fillers.

Examples of suitable fillers include glycidyl-functionalized crystalline silica modifications. It is also possible to use other fillers known per se. They are usually used in the stated range from 10 to 45% by weight, based on the overall weight of the powder coating material. In certain cases, however, filler fractions of more than 45% by weight are also possible.

The crystalline silica modifications include quartz, cristobalite, tridymite, keatite, stishovite, melanophlogite, coesite, and fibrous silica. The crystalline silica modifications are preferably glycidyl-functionalized, the glycidyl functionalization being achieved by means of a surface treatment. The silica modifications in question are, for example, those based on quartz, cristobalite and fused silica which are prepared by treating the crystalline silica modifications with epoxysilanes. The powder coating materials advantageously contain from 10 to 45% by weight of glycidyl-functionalized crystalline silica modifications, based on the overall weight of the powder coating material.

Additionally or alternatively, the powder coating materials may comprise further inorganic fillers, example material being titanium dioxide, barium sulfate or calcium carbonate and silica-based fillers, such as talc, kaolin, magnesium silicates, aluminum silicates, mica, and the like.

Moreover, the powder coating materials may, if desired, contain auxiliaries and additives. Examples of such are leveling agents, flow aids, and devolatilizers, such as benzoin, for example.

The powder coating materials are prepared in accordance with known methods (cf., e.g., Product Information from BASF Lacke+Farben AG, "Pulverlacke" [Powder coating materials], 1990) by homogenizing and dispersing, by means of an extruder, screw-type kneading apparatus and the like, for example. The extruder temperatures are preferably from 100° C. to 150° C., with particular preference from 120 to 130° C. After the powder coating materials have been prepared, they are brought by grinding and, if appropriate, by sieving and classifying to the desired particle size distribution. For grinding it is possible to use grinding aids such as Aerosil.

Following their preparation, the powder coating materials are applied to the target substrates and baked.

In accordance with the invention it is preferred here to observe limits with regard to the baking temperature (substrate temperature) and baking times. Particularly outstanding results are achieved if the maximum baking time at a baking temperature of 180° C. is 15 min, the maximum time at 190° C. is 11 min, and the maximum time at 200° C. is 4 min. In the coatings which have been produced under these conditions the desired effects, the freedom from squeaking and scratching noises under sliding stressing, are established with a particularly high degree of reliability and certainty.

EXAMPLE

The Preparation of a Low-noise Powder Coating Material 37 parts by weight of a carboxyl-containing polyester (Rearfree 6600 from Resisa, Spain), 35 parts by weight of chalk, 19 parts by weight of an epoxy resin (Araldit® R GT 6063 from Ciba), 6 parts by weight of a leveling agent (masterbatch based on an epoxy resin, containing the low molecular mass polyacrylate resin Acronal® 4F from BASF Aktiengesellschaft; Epikote® 3003-FCA-10 from Shell AG, Germany), 1.6 parts by weight of a hard linear polyethylene wax with a dropping point of between 120 and 130° C., an upper particle size limit of 20μm and an average particle size (50% value) of from 6 to 8μm, and 0.8 part by weight of pigmentary carbon black were mixed and the mixture was extruded at a temperature of from 120 to 130° C. The extrudate discharged was ground in a powder mill, using 0.8 part by weight of Aerosil®380 as grinding aid.

The resultant powder coating material had the following technological properties:

Melting range (DSC method): $Tg_1$=55 to 65° C.;
Gel time (DIN 55990): 40 to 45 s at 200° C.;
Particle size distribution (Sympatec laser): <32 μm: 35 to 50%; >90μm: 0 to 5%; Baking conditions (holding time at substrate temperature): 10 min at 180° C.;
Density (DIN 55990): 1.55 g/cm$^3$;
Storage stability at room temperature: 24 months.

The powder coating material was used to coat the slide rails of window frames in automobile bodies.

The resultant coatings had the following technological properties:

Film thickness (DIN EN ISO 2178): 60 to 80μm;
Gloss (DIN 67530, 60 degrees measurement angle): 52 to 58;
Adhesion (cross-cut DIN EN ISO 2409): GT 0;
Hardness (Buchholz DIN 53153): >80;
Flexure (DIN EN ISO 1519): ≦6;
Impact (ASTM D 2794): ≧4 J;
Erichsen cupping (DIN EN ISO 1520): ≦5 mm;
Salt spray test (DIN 50021): 1,000 hours;
Condensation test (DIN 50017): 1,000 hours.

The slide carriages with the window panes were inserted into the coated slide rails of the window frames and moved with the aid of the customary and known electric window lifters. During this operation, even when carried out long-term, there were no squeaking and scratching noises.

What is claimed is:

1. A process for preparing a powder coating material comprising homogeneously distributing at least one polyethylene wax in the powder coating material in an extruder, wherein the extruder is operated at a temperature of from 120° C. to 150° C., wherein the powder coating material comprises a polymeric resin, wherein the polyethylene wax has an upper particle size limit of 50μm prior to being distributed in the powder coating material, wherein the polyethylene wax has a dropping point of from 120° C. to 150° C. and wherein the extruder temperature and the dropping point are selected so that the dropping point is harmonized with the extruder temperature.

2. The process of claim 1, wherein the distributing is via at least one of i) prior to extrusion and ii) during extrusion.

3. The process of claim 1, wherein the polyethylene wax is linear.

4. The process of claim 1, wherein the powder coating material comprises from 0.05 to 5% by weight of polyethylene wax.

5. The process of claim 1, wherein the powder coating material comprises from 0.5 to 2% by weight of polyethylene wax.

6. The process of claim 1, wherein the polyethylene wax has an average particle size of from 6 to 8μm.

7. The process of claim 1, wherein the upper particle size limit is 30μm.

8. The process of claim 1, wherein the polyethylene wax has a dropping point of from 120° C. to 130° C.

* * * * *